United States Patent [19]

Nakata et al.

[11] Patent Number: 4,610,231
[45] Date of Patent: Sep. 9, 1986

[54] START SAFETY APPARATUS FOR INTERNAL COMBUSTION ENGINE

[75] Inventors: Hiroshi Nakata, Yokohama; Houkichi Souma, Hino, both of Japan

[73] Assignee: Oppama Kogyo Kabushiki Kaisha, Yokosuka, Japan

[21] Appl. No.: 671,887

[22] Filed: Nov. 15, 1984

[30] Foreign Application Priority Data

Sep. 5, 1984 [JP] Japan ............................ 59-133994[U]

[51] Int. Cl.4 ............................................. F02P 5/02
[52] U.S. Cl. .................... 123/424; 123/602; 123/630
[58] Field of Search ......... 123/424, 602, 630, 179 BG

[56] References Cited

U.S. PATENT DOCUMENTS

| | | | |
|---|---|---|---|
| 4,096,843 | 6/1978 | Marsee | 123/424 |
| 4,344,395 | 8/1982 | Kondo et al. | 123/335 |
| 4,491,105 | 1/1985 | Johansson | 123/630 |
| 4,553,517 | 11/1985 | Andreasson | 123/424 |

Primary Examiner—Andrew M. Dolinar
Attorney, Agent, or Firm—Browdy & Neimark

[57] ABSTRACT

A start safety apparatus for an internal combustion engine of a multi-purpose working machine such as a chain saw or grass trimmer is disclosed, wherein the ignition timing of the internal combustion engine is retarded at the time of starting the engine, so that the rotational speed of the internal combustion engine is reduced below the clutch-in speed where the load of the saw chain and cutting blade, as the case may be, is to be operated.

1 Claim, 5 Drawing Figures

START SAFETY APPARATUS FOR INTERNAL COMBUSTION ENGINE

The present invention relates to a start safety apparatus for an internal combustion engine, or more in particular to a safety device for securing safety in starting a portable machine such as chain saw or grass trimmer having an internal combustion engine.

A multi-purpose (portable) working machine such as chain saw or grass trimmer equipped with an internal combustion engine is well known. A chain or cutting blade of the chain saw or the grass trimmer, as the case may be, is placed near the worker to secure an improved efficiency. The internal combustion engine of the multi-purpose working machine, however, is generally started with the throttle valve thereof kept at a predetermined opening in order to improve the starting characteristics. A throttle control latch as one member of throttle latch structure is used to keep the throttle valve at a predetermined angle of opening. The throttle button has the function to latch the throttle valve above a predetermined opening and improves the starting characteristics of the internal combustion engine by increasing the amount of intake air at the time of engine start.

Since the throttle valve is maintained at a predetermined opening by the time of starting the internal combustion engine with the throttle latch, the rotational speed of the internal combustion engine immediately increases to a level capable of connecting a centrifugal clutch.

The centrifugal clutch is for coupling the engine to the chain or cutting blade of the chain saw or the grass trimmer making up the multi-purpose working machine respectively. The chain or the cutting blade is actuated at the same time as the engine starts, thereby leading to the disadvantage of a hazard of bodily injury offered to the operator.

The present invention, which is intended to obviate the above-mentioned prior art device, provides a start safety device for portable working machines of which safety is improved without sacrificing the starting characteristics of the internal combustion engine.

In order to achieve the above-mentioned object in a multi-purpose working machine comprising a throttle control latch for setting the throttle valve of an internal combustion engine to a predetermined opening and a centrifugal clutch, there is provided according to the present invention a start safety apparatus comprising an ignition timing control device for controlling the speed of the internal combustion engine to proper level, a delay switch operatively interlocked with the throttle control latch and an ignition timing retarder for retarding the ignition timing by operating the delay switch, in which the speed of the internal combustion engine is kept below the clutch-in speed of the internal combustion engine is kept below the clutch-in speed of the centrifugal clutch at the time of starting the engine.

The speed of an internal combustion engine is reduced by retarding the ignition timing while maintaining opening of the throttle valve at a fixed level. The present invention takes advantage of this characteristic of the internal combustion engine in such a manner that the ignition timing is switched between a proper value and a retarded value by a delay switch operatively interlocked with a throttle control latch thereby to stabilize the starting performance of the internal combustion engine while at the same time limiting the engine speed below the clutch-in speed of the centrifugal clutch.

According to the present invention, the internal combustion engine of a multi-purpose working machine is stabilized by incrasing the amount of intake air while maintaining the throttle valve opening constant with a throttle control latch at the time of engine start and at the same time the speed of the internal combustion engine is reduced below the clutch-in speed of the centrifugal clutch. In other words, it is possible to start the internal combustion engine without actuating the chain or cutting blade connected on the load side of the centrifugal clutch, thus securing the safety of the operator.

The above and other objects, features and advantages will be made apparent by the detailed description taken in conjunction with the accompanying drawings, in which:

FIG. 3 is a diagram showing waveforms produced at parts of the apparatus when the delay circuit is on;

Figure 1:
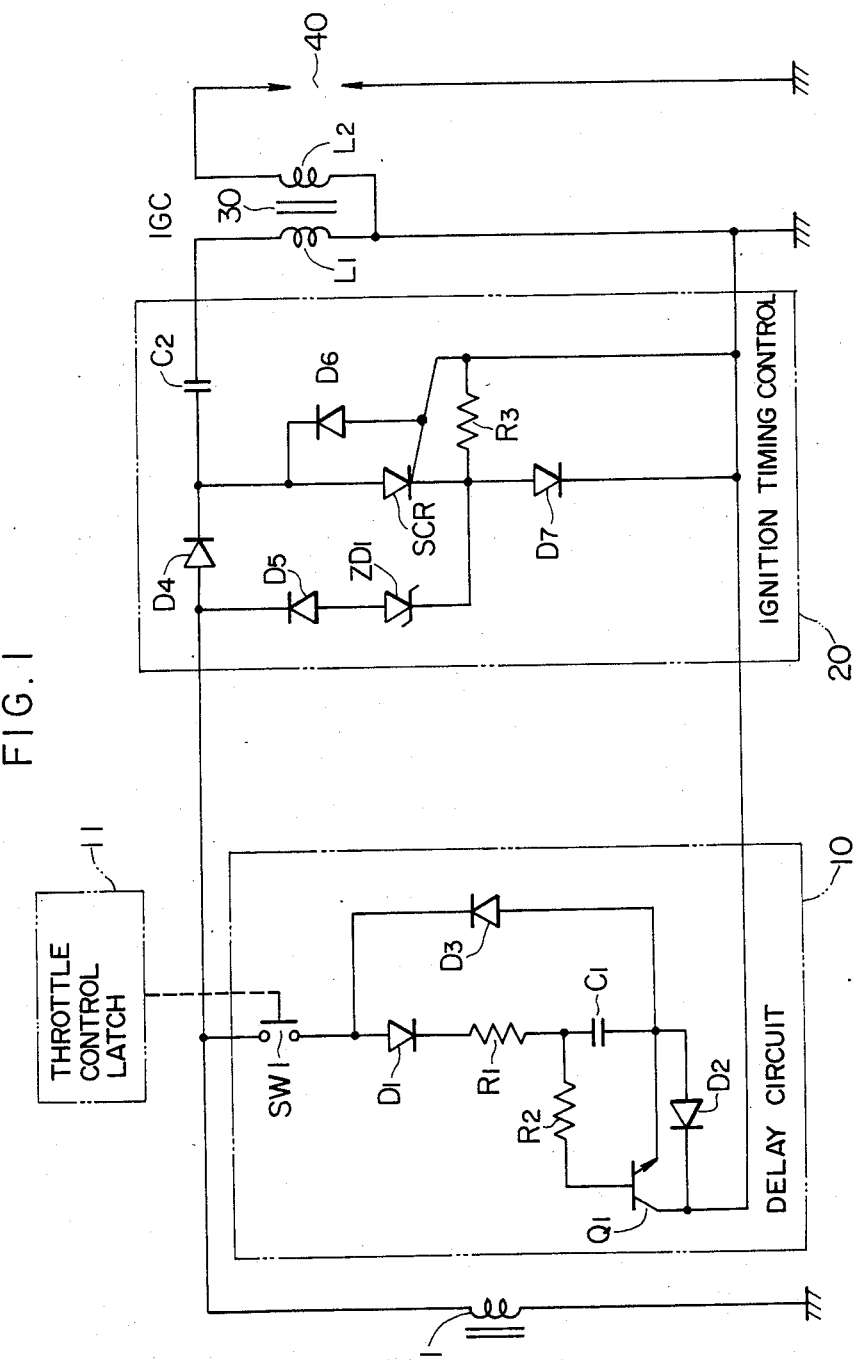
FIG. 1 is a circuit diagram of a start safety apparatus for an internal combustion engine according to an embodiment of the present invention.

A circuit of a start safety apparatus for an internal combustion engine according to an embodiment of the present invention is shown in FIG. 1. Reference numeral 1 designates an exciter coil, numeral 10 a delay circuit section, numeral 20 an ignition timing control section, numeral 30 an ignition coil, and numeral 40 an ignition plug. The output waveform of the exciter coil 1 exhibits an AC voltage as shown in (A) of FIG. 2. The trigger level shown will be explained later.

The delay circuit section 10 includes a delay switch $SW_1$ operatively interlocked with a throttle control latch 11 as one member of throttle latch structure, a transistor $Q_1$, resistors $R_1$, $R_2$ and a capacitor $C_1$ making up a delay circuit, and reverse flow-blocking diodes $D_1$, $D_2$, $D_3$. The delay switch $SW_1$ is turned on at the time of throttle latch and is tuned off at the time of throttle latch release in interlocked relation with the throttle control latch.

The ignition timing control section 20 includes a capacitor $C_2$, a thyristor SCR and a diode $D_4$ for supplying or interrupting the current to the ignition coil, a resistor $R_3$ and a zener diode $ZD_1$ for setting the trigger level of the thyristor, and reverse-flow-blocking diodes $D_5$, $D_6$, $D_7$.

Now, the operation of the circuit according to the embodiment under consideration will be explained with reference to FIGS. 1, 2 and 3.

First, reference will be had to the case in which the thottle control latch is released (with the delay switch $SW_1$ off). The positive portion of the AC voltage generated in the exciter coil 1 charges the capacitor $C_2$ through the diode $D_4$ of the ignition timing control section 20. As long as the exciter diode 1 is kept at positive voltage, the gate and the cathode of the thyristor SCR are kept at the same potential, thus keeping the thyristor SCR off.

Figure 2:
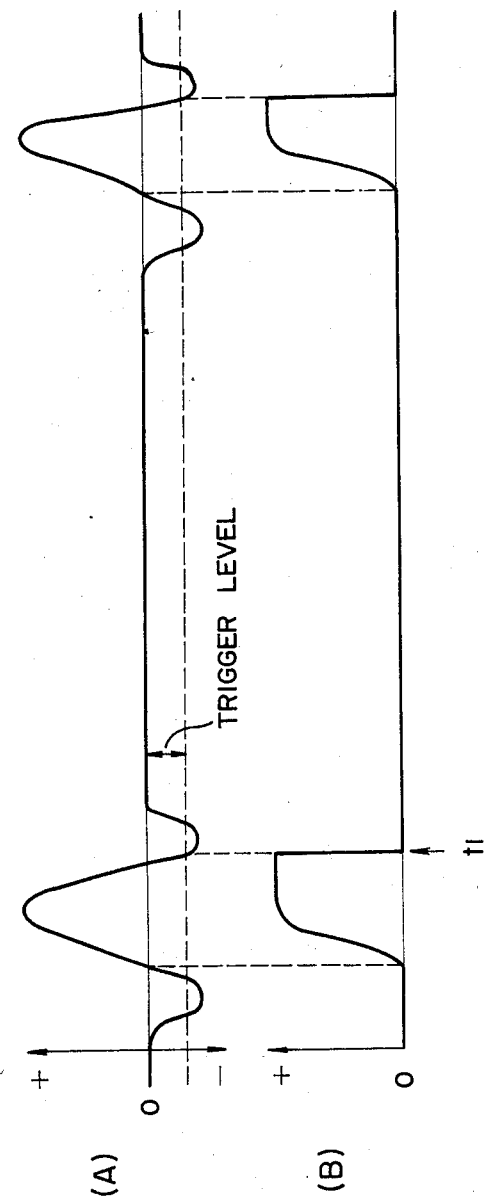
FIG. 2 is a diagram showing waveforms produced at parts of the apparatus when a delay circuit is off.
Figure 3:
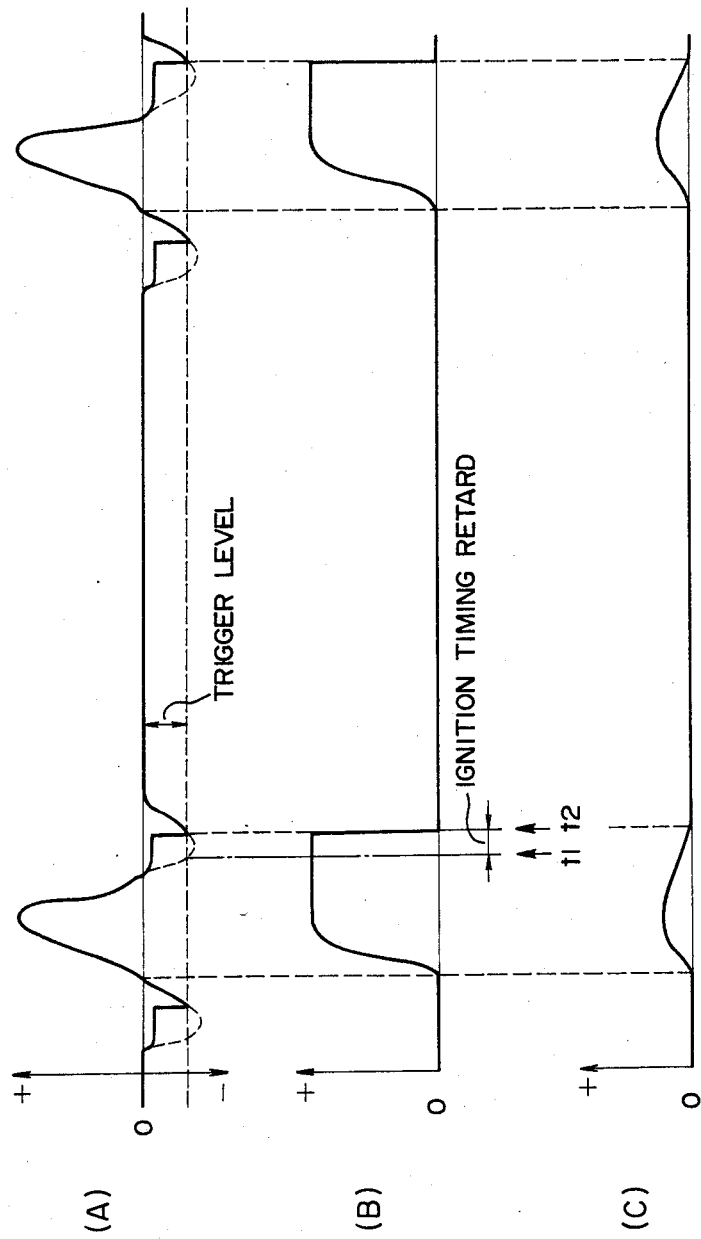

When the exciter coil 1 changes from positive to negative voltage, the resistor $R_3$, zener diode $ZD_1$ and the diode $D_5$ are turned on, so that when the potential between the gate and cathode of the thyristor SCR exceeds the trigger level shown in (A) of FIG. 2, the thyristor SCR is turned on. The anode of the thyristor SCR is kept at a positive voltage by the capacitor $C_2$.

As the result of turning on of the thyristor SCR, the charge voltage of the capacitor $C_2$ is discharged through the thyristor SCR, diode $D_7$, and the ignition coil 30 of the primary side $L_1$. In the process, a high voltage is induced in the secondary $L_2$ of the ignition coil 40 thereby to start a spark discharge of the ignition plug 40.

This spark discharge provides an ignition timing of the internal combustion engine. This ignition timing is determined by the negative voltage of the exciter coil 1, the gate-on voltage of the thyristor SCR and the zener voltage of the zener diode $ZD_1$. FIG. 2 shows an output waveform (A) of the exciter coil 1, the voltage waveform (B) of the capacitor $C_2$, and the ignition timing ($t_1$) which is substantially fixed against the rotational speed of the internal combustion engine. Normally, the ignition timing is about 25 to 30 degrees before top dead center (BTDC 25° to 30°).

Now, the internal combustion engine started with the throttle latched will be explained. In the throttle-latched state, the delay switch $SW_1$ is closed. The positive voltage of the exciter coil 1 is applied through the diode $D_4$ to charge the capacitor $C_2$, while at the same time charging the capacitor $C_1$ through the diode $D_1$ and resistor R of the delay circuit section 10. The charge voltage of the capacitor $C_1$, discharged through the resistor $R_2$ and transistor $Q_1$, actuates the base-emitter conduction of the transistor $Q_1$ for a predetermined period of time with a discharge time constant determined by the electrostatic capacitance of the capacitor $C_1$ and the resistance value of the resistor $R_2$.

If a negative voltage is produced across the exciter coil 1 while the transistor $Q_1$ is on, the negative voltage is applied through a bypass including the emitter and collector of the transistor $Q_1$, diode $D_3$ and delay switch $SW_1$ of the delay circuit section 10. As a result, the negative voltage of the exciter coil 1 drops. Also, the voltage between gate and cathode of the thyristor SCR of the ignition timing control section 20 fails to reach the trigger level.

When a predetermined time based on the discharge time constant of the capacitor $C_1$ and resistor $R_2$ of the delay circuit 10 passes, the transistor $Q_1$ is turned off. Therefore, the negative voltage of the exciter coil 1 that has thus far been applied through a bypass is supplied between the gate and cathode of the thyristor SCR, and when it reaches the trigger level, the thyristor SCR is turned on. The zener voltage of the zener diode $ZD_1$ is determined taking the voltage drop across the delay circuit section 10 into consideration thereby to improve the operation stability of the thyristor SCR. Upon turning on of the thyristor SCR, the capacitor $C_2$ of the ignition timing control section 20 is discharged. As soon as the delay switch $SW_1$ is turned off, a high voltage is induced in the secondary $L_2$ of the ignition coil 30 thereby to start a spark discharge on the ignition plug 40. FIG. 3 shows an output waveform A of the exciter coil 1, a charge-discharge waveform B of the capacitor $C_2$, and an ignition timing $t_2$. It is seen that as compared with normal ignition timing (with the delay switch $SW_1$ off), the ignition timing (with the delay switch $SW_1$ on) is advanced with the ignition delay circuit 10 operated. By providing a predetermined retardation angle to the ignition delay circuit 10, the speed of the internal combustion engine is reduced. The retardation of the ignition timing should be determined in such a way that the speed of the internal combustion engine is reduced below the clutch-in rotational speed of the centrifugal clutch when the throttle valve is open under locked state.

In the case of an internal combustion engine with the displacement of 25 cc to 45 cc, the normal ignition timing of 25 to 30 degree before top dead center and the clutch-in rotational speed of 3000 to 3600 rpm, for example, the ignition timing is retarded by the delay circuit 10 to about 5 degree before and after top dead center (BTDC 5° to ATDC 5°), thereby making it possible to reduce the rotational speed of the internal combustion engine to 2000 to 3000 rpm.

Figure 4:
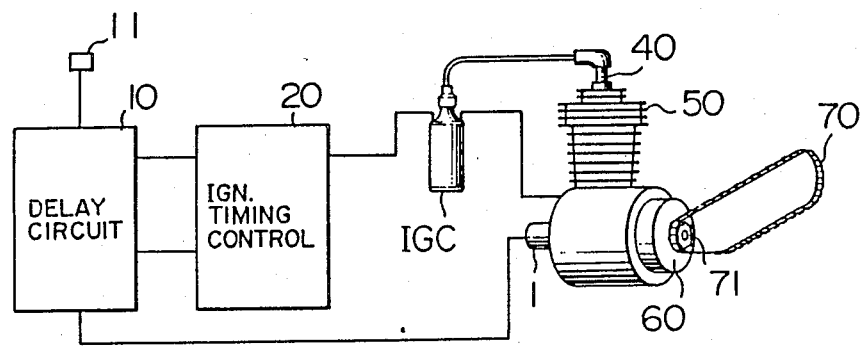
FIG. 4 is a schematic diagram showing the present invention in its environment.

FIG. 4 shows an embodiment applying the present invention to a chain saw. A centrifugal clutch 60 is connected to a drive shaft of an engine 50. When the engine 50 exceeds in its revolution speed a predetermined rpm, the centrifugal clutch 60 connects between the drive shaft and a sprocket 71 so as to drive the chain 70. At a starting of the engine, the ingnition timing control circuit 20 is controlled by the delay circuit 10 such that a normal ignition timing is retarded with preset angles. The exciter coil 1 generates AC signal as shown in FIG. 2(A) in synchronizing with the engine revolution.

Figure 5:
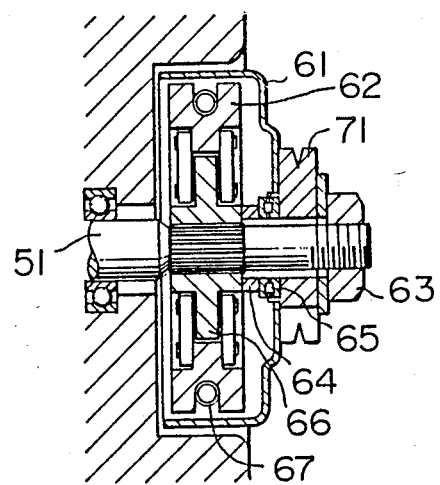
FIG. 5 is a cross-sectional view of a conventional centrifugal clutch which can be used in association with the present invention.

FIG. 5 is a view, in cross section, of a portion of the centrifugal clutch 60 with connection between the drive shaft 51 of the engine 50 and the sprocket 71. In FIG. 5, 61 is a clutch drum which is welded to the sprocket 71 and tightened to a clutch body 66 via a spacer 64 and bearing 65 by a nut 63 so that the clutch body is rotatable freely from the drum and sprocket when the clutch is not engaged. The clutch body 66 is securely connected to the drive shaft 51. When the engine speed rises over the clutch-in speed, the centrifugal force overcomes the tension force of a coil spring 67 so that a clutch pad 62 engages with the inner face of the clutch drum 61.

We claim:

1. A start safety apparatus of an engine adapted for a multi-purpose power tool comprising:
    an engine;
    an exciter coil generating alternate electromotive force in synchronism with rotation of said engine;
    an ignition coil having primary and secondary windings;
    a spark plug connected to the secondary winding of said ignition coil;
    a capacitor connected to the primary winding of said ignition coil, said capacitor being charged with a positive half-cycle of said electromotive force;
    ignition timing control means for controlling discharge of said capacitor;
    a throttle control latch for setting a throttle valve of the engine in a predetermined throttle angle;
    a tool driven by said engine; and
    a centrifugal clutch transferring engine power to said tool when an engine speed exceeds a clutch-in speed,
    wherein said ingition timing control means includes a semiconductor switching device controlled by a trigger voltage, said switching device being conductive by said trigger voltage during a period of a negative half-cycle of said electromotive force when the negative voltage of said negative half-cycle of the electromotive force reaches to a predetermined level, and at the same time the charged voltage of said capacitor is discharged through said conductive switching device, said ignition timing control means includes ignition timing retard means for retarding ignition timing from a regular ignition timing to reducing the engine speed lower than said clutch-in speed in response to activation of said throttle control latch when the engine is started in such a manner that said exciter coil is shunted in a predetermined period during the negative half-cycle of said electromotive force thereby to reduce the trigger voltage lower than a level as said switching device is conductive so as to retard the spark timing by said predetermined period.

* * * * *